G. HARROLD.
ADJUSTABLE CURTAIN FOR WIND SHIELDS.
APPLICATION FILED MAR. 14, 1918.
1,309,133.
Patented July 8, 1919.
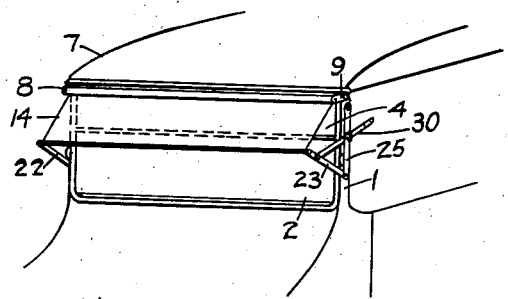
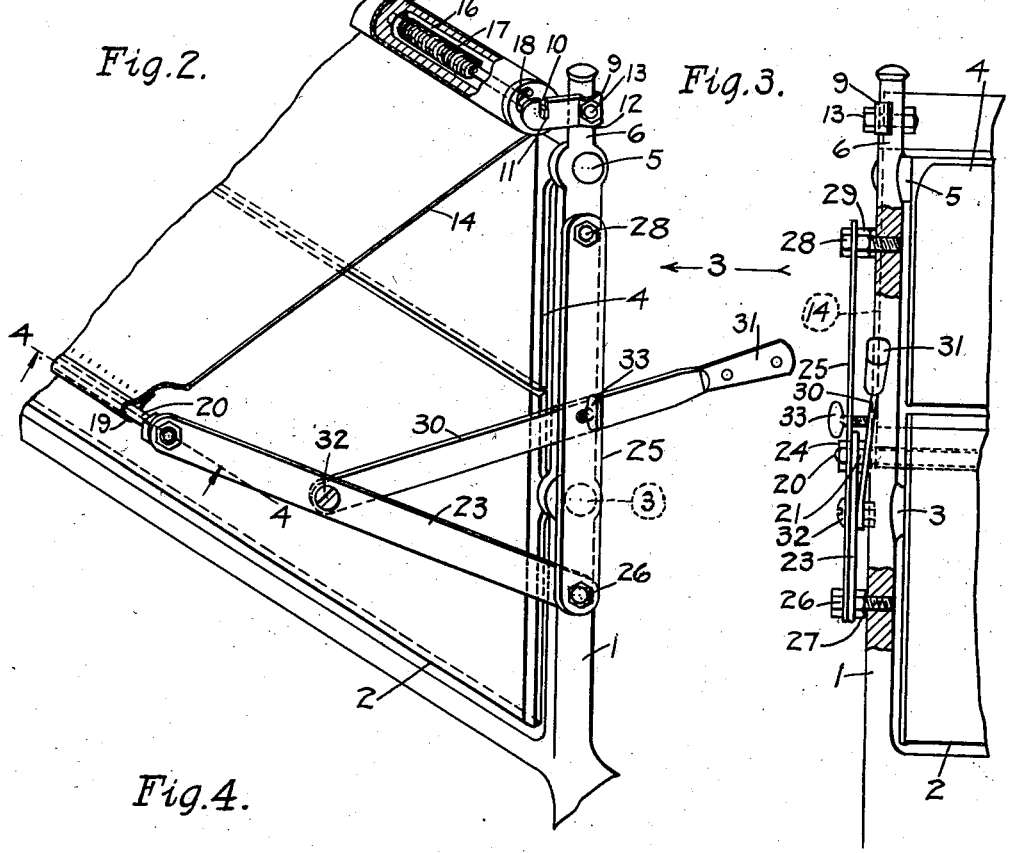
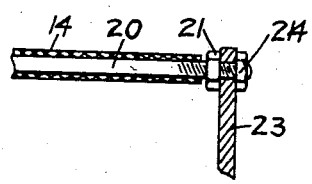
Inventor:
George Harrold
by Hazard & Miller
Att'ys.

UNITED STATES PATENT OFFICE.

GEORGE HARROLD, OF LOS ANGELES, CALIFORNIA.

ADJUSTABLE CURTAIN FOR WIND-SHIELDS.

1,309,133.  Specification of Letters Patent.  Patented July 8, 1919.

Application filed March 14, 1918. Serial No. 222,463.

*To all whom it may concern:*

Be it known that I, GEORGE HARROLD, a citizen of the United States, residing at Los Angeles, in the county of Los Angeles and State of California, have invented new and useful Improvements in Adjustable Curtains for Wind-Shields, of which the following is a specification.

My object is to make an improved adjustable curtain for windshields and my invention consists in the novel features herein shown, described and claimed.

Figure 1 is a perspective showing my adjustable curtain in position for use in relation to a windshield.

Fig. 2 is a fragmentary perspective upon an enlarged scale showing the details of constructing the adjustable curtain and mounting it upon a windshield.

Fig. 3 is a fragmentary rear elevation as seen looking in the direction indicated by the arrow 3 in Fig. 2, parts being shown in section.

Fig. 4 is a fragmentary sectional detail on the line 4—4 of Fig. 2.

In the form of windshield shown, a post 1 extends upwardly at each end of the windshield and the lower half 2 of the windshield is mounted upon trunnions 3 extending into the posts and the upper half 4 of the windshield is mounted upon trunnions 5 extending into the bearings at the upper end of the posts. Arms 6 extend upwardly from the posts 1 above the trunnions 5 and the automobile top construction 7 is attached to these arms. Curtain brackets 8 and 9 are secured to the arms 6, said brackets being substantially alike with the exception that the bracket 8 has a bearing for the rotating pintle of the curtain and the bracket 9 has a slotted bearing 10 to receive the squared pintle 11 and hold the pintle from rotation, as required to hold one end of the spring. The bracket 9 has a curved base 12 fitting half way around the arm 6, and a bolt 13 is inserted through the arm and through the curved base so that the bracket is held rigidly in a horizontal position with the slotted bearing 10 extending forwardly. The curtain 14 is mounted to wind upon a spring roller 15, there being a socket 16 in one end of the roller, the body of the pintle 11 extending into the socket 16, and a coil spring 17 having one of its ends connected to the body of the pintle and the other end connected to the roller. The spring roller 15 is provided with the usual centrifugal pawl construction 18.

The forward edge of the curtain 14 is doubled upon itself and stitched to form a loop 19 and a rod 20 is inserted through this loop, both ends of the rod being screw-threaded. Jam nuts 21 are placed upon the screw-threaded ends of the rod. Curtain swinging arms 22 and 23 are formed of strap iron cut to the desired length and bolt holes are formed in each of their ends. The arms 22 and 23 are placed in position against the jam nuts 21 and retaining nuts 24 are applied to the outer ends of the rod against the arms. A keeper 25 is formed of strap iron cut to the desired length and perforated in both ends. A cap screw 26 is inserted through the lower end of the keeper 25, through the rear end of the arm 23, through a spacing nut 27, and tapped into one of the posts 1. A cap screw 28 is inserted through the upper end of the keeper 25 through a spacing nut 29 and tapped into one of the posts 1. The rear end of the arm 22 is connected to the other post 1 by a cap screw and spacing nut, the keeper 25 being omitted.

The operating lever 30 extends between the keeper 25 and the post 1 and has a handle 31 upon its rear end. The forward end of the lever 30 is connected to the arm 23 by a bolt 32. A set screw 33 is tapped through the center of the keeper 25 and is adapted to engage the operating lever 30 and clamp it against the post 1 and hold the arm 23 rigidly in its adjusted position and hold the curtain 14 taut.

The rod 20 is substantially the same distance from the cap screws 26 as the spring roller 15 so that when it is desired to roll the curtain out of use the set screw 33 is loosened and the tension of the spring 17 will pull the curtain and wind the curtain upon the roller 15 and swing the arms 22 and 23 upwardly until the rod 20 is near the roller 15. By grasping the arms 22 and 23 or the rod 20 the curtain may be drawn downwardly to any desired extent and held by the pawl mechanism 18. If the weather is bad or the wind is blowing hard, the handle 31 may be manipulated to adjust the curtain to any desired position and the set screw 33 manipulated to hold the adjusting lever 30 and assist in holding the curtain.

Various changes may be made in the details of construction without departing from the spirit of my invention as claimed.

I claim:

An adjustable curtain construction for windshields comprising the combination with windshield posts, of curtain brackets secured to the upper ends of the posts, a spring roller mounted in the curtain brackets, a curtain upon the spring roller, a rod connected to the forward edge of the curtain, curtain swinging arms connected to the ends of the rod and pivoted to the windshield posts, an operating lever pivotally connected to one of said arms intermediate its length and means for locking the lever in place to hold the curtain in desired position.

In testimony whereof I have signed my name to this specification.

GEORGE HARROLD.